(12) United States Patent
Yoshioka et al.

(10) Patent No.: US 8,023,220 B2
(45) Date of Patent: Sep. 20, 2011

(54) METHOD FOR WRITING SERVO DATA TO A DISK AND DISK DRIVE CONFIGURED TO WRITE SERVO DATA UTILIZING THE METHOD

(75) Inventors: Masaki Yoshioka, Kanagawa (JP); Kei Yasuna, Kanagawa (JP); Makoto Takase, Kanagawa (JP); Ryohheita Hattori, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 0 days.

(21) Appl. No.: 12/545,773

(22) Filed: Aug. 21, 2009

(65) Prior Publication Data

US 2011/0080672 A1    Apr. 7, 2011

(30) Foreign Application Priority Data

Aug. 23, 2008   (JP) .................................. 2008-214743

(51) Int. Cl.
*G11B 5/596* (2006.01)
(52) U.S. Cl. ................................. 360/77.07; 360/78.04
(58) Field of Classification Search ........................ None
See application file for complete search history.

(56) References Cited

U.S. PATENT DOCUMENTS

| 7,106,542 | B1 * | 9/2006 | Sun et al. ........................ 360/75 |
| 7,126,783 | B2 | 10/2006 | Suzuki et al. |
| 2005/0128617 | A1 | 6/2005 | Kuroda et al. |
| 2006/0109583 | A1 | 5/2006 | Sado et al. |

FOREIGN PATENT DOCUMENTS

| JP | 09091907 | 4/1997 |
| JP | 09134576 | 5/1997 |
| JP | 11224474 | 8/1999 |

* cited by examiner

*Primary Examiner* — K. Wong

(57) ABSTRACT

A method for writing servo sector sets that include a plurality of separate servo sectors on a disk so that servo sectors are present at same circumferential positions but different radial positions. The method includes reading a first servo sector set in a track with a read element such that the track includes first, second and third servo sector sets. The method also includes writing the third servo sector set with a write element at a different radial position from the read element with positional control and timing control using the first servo sector set while skipping the second servo sector set if all servo sectors of the first servo sector set are non-defective. Moreover, the method includes using positional control and timing control using the second servo sector set in the writing of the third servo sector set if the first servo sector set includes a defective servo sector.

18 Claims, 9 Drawing Sheets

METHOD FOR WRITING SERVO DATA TO A DISK AND DISK DRIVE CONFIGURED TO WRITE SERVO DATA UTILIZING THE METHOD

CROSS-REFERENCE TO RELATED APPLICATION

This application claims priority from the Japanese Patent Application No. 2008-214743, filed Aug. 23, 2008, the disclosure of which is incorporated herein in its entirety by reference.

TECHNICAL FIELD

Embodiments of the present invention relate to disk drives and methods for writing servo data to a disk of a disk drive.

BACKGROUND

Disk drives using various kinds of media, such as optical disks, magneto-optical disks, flexible magnetic-recording disks, and similar information-storage disks are known in the art. In particular, hard disk drives (HDDs) have been widely used as information-storage devices that are indispensable for contemporary computer systems. Moreover, HDDs have found widespread application to moving-image recording and reproducing apparatuses, car navigation systems, cellular phones, and similar devices, in addition to computers, because of the outstanding information-storage characteristics of HDDs.

A magnetic-recording disk used in a HDD includes multiple concentric data tracks and servo tracks. A data track includes multiple data sectors and a servo track includes multiple servo sectors. Each servo sector includes elements such as a cylinder identification, which is track identification, a sector number and a burst pattern. The cylinder identification indicates an address of the track and the sector number indicates a sector address in the track. The burst pattern indicates a relative position of a magnetic-recording head with respect to the track. The magnetic-recording head fabricated with thin-film deposition technology includes thin-film elements configured to access a desired area which is specified by an address, according to servo data to write data to, and to read data from, the magnetic-recording disk.

A recording surface of the magnetic-recording disk includes user data areas where user data is stored and servo areas where servo data, which include servo patterns, are stored. In the radial direction, multiple user data areas and servo areas are arranged in such a way that each servo area is between user data areas. The servo track includes multiple separate servo sectors at the same radial position. The servo area includes a row of servo sectors arranged continuously in the radial direction.

The servo data are written on the magnetic-recording disk at a manufacturing facility before delivery of the product HDD. Conventional servo writing employs an external apparatus, a servo track writer. The servo track writer positions an actuator in a HDD mounted thereon by a positioner, which is an external positioning mechanism, and writes patterns generated by a pattern generation circuit on the magnetic-recording disks.

At present, the servo writing operation, also known by the term of art, "servo track write (STW)," is one of the more a costly operations in the manufacture of HDDs. In recent years, competition for higher capacity in HDDs has become more acute; and, track density has been increasing. An increase in the track density results in an increase in the number of tracks and reduction in track width, which determines track pitch. These result in an increase in STW time that has lead to the use of higher precision servo writers. As a result, the cost of STW has increased. Thus, cost reductions are being pursued.

SUMMARY

Embodiments of the present invention include a method for writing servo sector sets that include a plurality of separate servo sectors in a circumferential direction at different radial positions on a disk so that servo sectors are present at same circumferential positions but with different radial positions. The method includes reading a first servo sector set in a track with a read element such that the track includes the first servo sector set, a second servo sector set and a third servo sector set. The method also includes writing the third servo sector set with a write element at a different radial position from the read element with positional control and timing control using the first servo sector set while skipping the second servo sector set if all servo sectors of the first servo sector set are non-defective. Moreover, the method includes using positional control and timing control using the second servo sector set in the writing of the third servo sector set if the first servo sector set includes a defective servo sector.

DESCRIPTION OF THE DRAWINGS

The accompanying drawings, which are incorporated in and form a part of this specification, illustrate embodiments of the invention and, together with the description, serve to explain the embodiments of the present invention.

Figure 1:
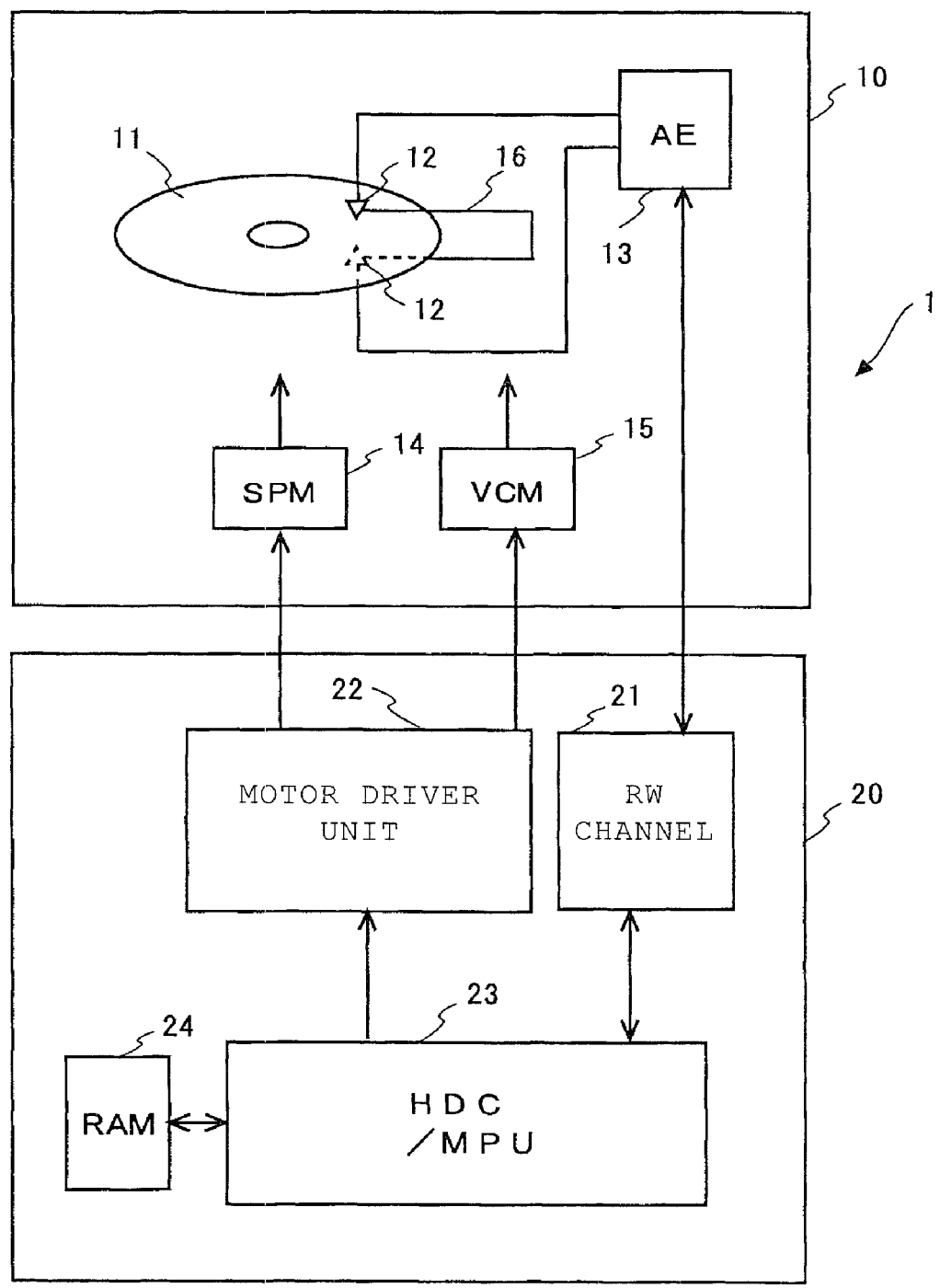
FIG. 1 is an example block diagram schematically depicting the configuration of a hard disk drive (HDD), in accordance with an embodiment of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary. Description of Embodiments of the Present Invention for a Method for Writing Servo Data to a Disk and a Disk Drive Configured to Write Servo Data Utilizing the Method In accordance with embodiments of the present invention, to reduce cost, self-servo writing (SSW) has been proposed as a new technique for the servo-track write (STW). SSW positions an actuator, to which a head-slider is attached, with servo control using servo data on a magnetic-recording disk as distinct from conventional STW and writes servo sectors on magnetic-recording disks obtaining cost reduction by eliminating the use of dedicated servo writers. SSW makes use of the difference between the positions of a read element and a write element of a magnetic-recording head; the distance between them is referred to by the term of art, "read-write offset." SSW carries out positioning while reading servo data already written in an inner area, or outer area, with the read element and writes new patterns in a desired track with the write element at the distance of the read-write offset from the read element.

As used herein, the term of art, "inner," refers to a position of an element (which may be a portion of the magnetic-recording disk, for example, a track, a sector, or a servo sector, or a portion of the magnetic-recording head relative to the magnetic-recording disk, for example, a read element, or a write element) with respect to the magnetic-recording disk that is disposed closer to the inside-diameter (ID) of the magnetic-recording disk than another element (which may be another portion of the magnetic-recording disk, or another portion of the magnetic-recording head relative to the magnetic-recording disk, for example, the write element, or the read element, respectively); similarly, the term of art, "outer," refers to a position of an element (which may be a portion of the magnetic-recording disk, for example, a track, a sector, or a servo sector, or a portion of the magnetic-recording head relative to the magnetic-recording disk, for example, a read element, or a write element) with respect to the magnetic-recording disk that is disposed closer to the outside-diameter (OD) of the magnetic-recording disk than the other element (which may be another portion of the magnetic-recording disk, or another portion of the magnetic-recording head relative to the magnetic-recording disk, for example, the write element, or the read element, respectively).

As described above, there are evidently different ways to write servo data on magnetic-recording disks. However, if a defect is present on a magnetic-recording disk, a servo sector may not be correctly written there regardless of the manner of servo writing. With relevance to embodiments of the present invention, faulty writing of servo data due to a defect on a disk may occur in the operation of servo writing. Servo writing using a dedicated, external servo writer does not use servo data on the magnetic-recording disk. Thus, faulty writing of servo data is not an issue for the operation of servo writing with a dedicated servo writer. Defects in servo data are detected in a test operation after servo writing with the dedicated servo writer. The servo defects detected in the test operation after servo writing can be handled by forming a plurality of groups of servo patterns over the entire recording surface and selecting a group of servo patterns without defects from them, as in the above-described conventional technique.

With further relevance to embodiments of the present invention, SSW writes new servo data while positioning an actuator using servo data written on the disk. Thus, if a defect exist in the written data, the precise servo control of the actuator is impossible by the written servo data associated with the defect. Therefore, a technique is desired that can position an actuator more precisely and write new servo data more accurately when defects exist in servo data written with SSW.

Embodiments of the present invention include a method for writing servo sector sets, each set including a plurality of separate servo sectors in a circumferential direction at different radial positions on a disk so that servo sectors are present at same circumferential positions but with different radial positions. The method includes reading a first servo sector set in a track with a read element; the track includes the first servo sector set, a second servo sector set and a third servo sector set. The method further includes writing the third servo sector set with a write element at a different radial position from the read element with positional control and timing control using the first servo sector set while skipping the second servo sector set if all servo sectors of the first servo sector set are non-defective. Moreover, the method includes using positional control and timing control using the second servo sector set in the writing of the third servo sector set if the first servo sector set includes a defective servo sector. Thus, servo data may be written more precisely.

In an embodiment of the present invention, the third servo sector set is written with positional control and timing control with only one servo sector set. The method enables writing servo data precisely with simple control. In another embodiment of the present invention, the method further includes inspecting the first servo sector set before writing the third servo sector set. If all the servo sectors of the first servo sector set are non-defective, the third servo sector set is written by the write element at a different radial position from the read element with the positional control and the timing control using only the first servo sector set. Moreover, if the first servo sector set includes a defective servo sector and a number of defective servo sectors of the second servo sector set is no more than a number of defective servo sectors of the first servo sector set, the third servo sector set is written with the positional control and the timing control using only the second servo sector set. Thus, servo data may be written more precisely.

In an embodiment of the present invention, one servo track includes a first group and a second group such that each group includes a plurality of servo sector sets: the first group including the first servo sector set and the second servo sector set;

the second group including the third servo sector set. A plurality of servo sector sets of the second group are written with positional control and timing control using only one servo sector set of the first group; and, a plurality of servo sector sets of the first group are written with positional control and timing control using only one servo sector set of the second group. Thus, an embodiment of the present invention enables writing servo data precisely with simple control.

In another embodiment of the present invention, all servo sector sets of the second group are written with the positional control and the timing control using only one servo sector set of the first group; and, all servo sector sets of the first group are written with the positional control and the timing control using only one servo sector set of the second group. Thus, another embodiment of the present invention enables writing servo data precisely with simple control. In accordance with an embodiment of the present invention, the method further includes selecting a servo sector set to be used in new writing of a servo sector set after inspecting all servo sector sets in a group. Thus, in yet another embodiment of the present invention, each servo sector set may be written more precisely.

In an embodiment of the present invention, the method further includes inspecting all servo sector sets over an entire recording surface of the disk. Thus, in one embodiment of the present invention, the optimal servo sector set may be selected. In another embodiment of the present invention, the method further includes selecting the servo sector set with the fewest defective servo sectors as a servo sector set used in user data access after writing servo sector sets over the entire recording surface of the disk. Another embodiment of the present invention accomplishes more precise user data access. In an embodiment of the present invention, the method further includes registering a defect detected in an inspection of servo sector sets as a defect in a user data area. Thus, an embodiment of the present invention prevents user data from being written in a detected defect area.

Other embodiments of the present invention include a disk drive for writing servo sector sets, each set including a plurality of separate servo sectors in a circumferential direction at different radial positions on a disk so that servo sectors are present at the same circumferential positions but with different radial positions. The disk drive includes a read element configured to read a first servo sector set in a track; the track includes the first servo sector set, a second servo sector set and a third servo sector set. The disk drive further includes a controller configured to perform positional control and timing control using the first servo sector set while skipping the second servo sector set if all servo sectors of the first servo sector set are non-defective; and, the controller is also configured to perform positional control and timing control using the second servo sector set if the first servo sector set includes a defective servo sector. Moreover, the disk drive includes a write element at a different radial position from the read element configured to write the third servo sector set under the positional control and the timing control of the controller. Thus, in another embodiment of the present invention, servo data may be written more precisely.

In accordance with embodiments of the present invention, it is possible to write servo data more precisely in SSW, which writes new servo data on a disk while positioning a magnetic-recording head with servo control using servo data written on a disk. In accordance with embodiments of the present invention, a hard disk drive (HDD) is next described as an example of a disk drive, by way of example without limitation thereto. Embodiments of the present invention include SSW of a HDD. SSW carries out positional control of an actuator with servo data written on a disk and writes new servo data on a magnetic-recording disk. In accordance with an embodiment of the present invention, the SSW writes a plurality of sets of servo sectors in one servo track. Each set includes a plurality of servo sectors separately formed at regular intervals. In accordance with an embodiment of the present invention, SSW selects a servo sector set with defects within a reference range, or the fewest defects, even no defects at all, from the plurality of servo sector sets and positions the actuator with the servo control using the servo sectors of the selected set to write a new servo track to the magnetic-recording disk. Since SSW writes a plurality of servo sector sets in the servo track on which the servo control is based and selects an appropriate servo sector set from the plurality of servo sector sets for writing a new servo track, SSW may write a new servo track more precisely.

In accordance with embodiments of the present invention, SSW writes servo data to the disks with control by the internal circuit on a circuit board of the product HDD, where integrated circuits (ICs) of the finished-product HDD are mounted. In accordance with embodiments of the present invention, SSW allows the HDD to perform a write operation of servo data to the magnetic-recording disks with substantially only internal configuration of the HDD, without depending on a servo writer in the form of an external apparatus. The HDD writes servo data to the magnetic-recording disks by functions implemented in an internal circuit of the HDD that are responsive to a start signal from an external controller.

With reference now to FIG. 1, in accordance with an embodiment of the present invention, before describing processes of SSW, a configuration of an HDD performing SSW is next described. FIG. 1 is a block diagram schematically depicting the configuration of an HDD 1. On a circuit board 20 affixed outside a disk enclosure (DE) 10, ICs such as a read-write channel (RW channel) 21, a motor driver unit 22, an integrated circuit (HDC/MPU) 23, which includes a hard disk controller (HDC) and a microprocessor unit MPU, and a semiconductor memory, which may in clued a random access memory (RAM) 24, are mounted. The circuit configuration may be integrated in one IC, or alternatively, implemented separately in several ICs.

With further reference to FIG. 1, in accordance with an embodiment of the present invention, in the DE 10, a spindle motor (SPM) 14 spins a magnetic-recording disk 11 at a specific angular rate of rotation, usually specified in revolutions per minute (rpm). The magnetic-recording disk 11, which is a disk for storing data, generally has recording surfaces on both sides, and head-sliders 12 are provided for each of the recoding surfaces, respectively. Head-sliders 12 to access the magnetic-recording disk 11, by which data is read from, or written to, the magnetic-recording disk 11, are secured at the distal end of an actuator 16. The actuator 16, which is a head-slider moving mechanism, is connected to a voice coil motor (VCM) 15 and rotates on a pivot shaft to move the head-sliders 12 in proximity to the recording surfaces of the magnetic-recording disk 11 along a nominally radial direction. A motor driver unit 22 drives the SPM 14 and the VCM 15 according to control data from the HDC/MPU 23.

With further reference to FIG. 1, in accordance with an embodiment of the present invention, head-sliders 12 to access, for example, in reading data from, or writing data to, the magnetic-recording disk 11 each include a slider and a magnetic-recording head which is formed on the slider. The magnetic-recording head includes a write element, which converts electrical signals to magnetic signals, and a read element, which converts magnetic signals from the magnetic-recording disk 11 to electrical signals. The configuration of the magnetic-recording head is subsequently described. One or more magnetic-recording disks 11 may be provided and each magnetic-recording disk 11 may be single-sided, or alternatively double-side.

With further reference to FIG. 1, in accordance with an embodiment of the present invention, an arm electronics (AE) module 13 selects a head-slider 12 to access, for example, in reading data from, or writing data to, the magnetic-recording disk 11 from a plurality of head-sliders 12 and amplifies read-back signals at a constant gain and sends the read-back signal to the RW channel 21. The arm electronics (AE) module 13 also sends write signals from the RW channel 21 to the selected head-sliders 12. In SSW, the AE module 13 transfers servo signals read by the selected head-sliders 12 to the RW channel 21 and transfers write data, for example, the servo data, from the RW channel 21 to all the head-sliders 12. The RW channel 21, in a write operation, code-modulates the write data supplied from the HDC/MPU 23, converts the code-modulated data into write signals, and then supplies the write signals to the AE module 13. The RW channel 21, in a read operation, extracts servo data and user data from the read signals obtained from the AE module 13 and decodes the read signals. The decoded data are supplied to the HDC/MPU 23. The RW channel 21 has a clock generator circuit; and, timing control of SSW is performed according to a clock signal generated by the RW channel 21. The HDD 1 may also use signals from another clock generator circuit.

With further reference to FIG. 1, in accordance with an embodiment of the present invention, on startup of the HDD 1, data for control and data processing are loaded into the RAM 24 from the magnetic-recording disk 11, or alternatively, a ROM (not shown), in addition to firmware operating on the MPU. In the HDC/MPU 23, the HDC is a logic circuit; and, the MPU works according to firmware loaded into the RAM 24. The HDC/MPU 23 is an example of a controller; and, the HDC/MPU 23 performs the entire control of the HDD 1, in addition to necessary processes associated with data processing, such as magnetic-recording head positioning control, interface control, and defect management. SSW is executed under the control of the HDC/MPU 23.

Figure 2:
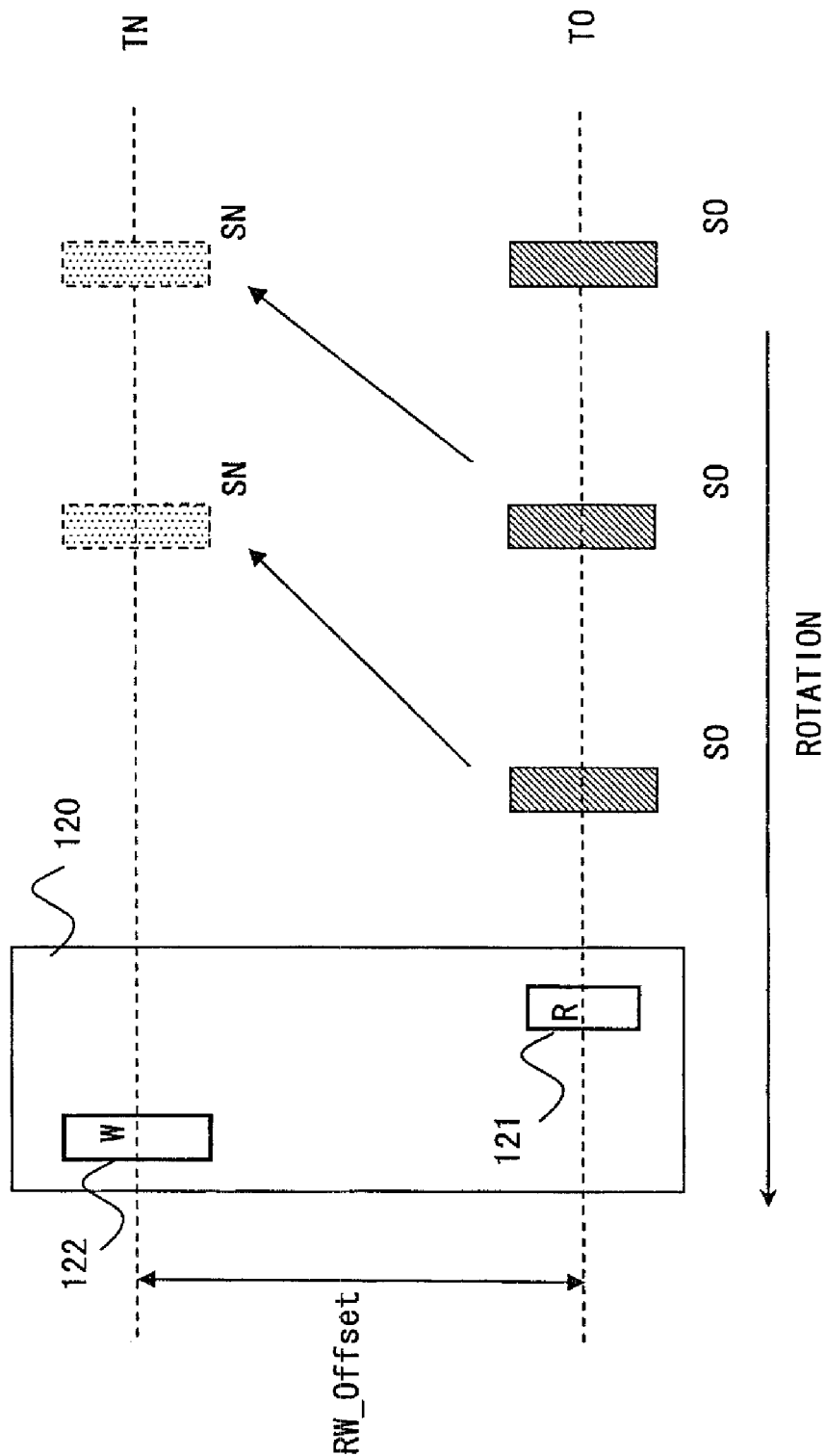
FIG. 2 illustrates a technique to write servo data in self-servo writing (SSW), in accordance with an embodiment of the present invention.

With reference now to FIG. 2, in accordance with an embodiment of the present invention, the technique to write servo data in SSW is shown. SSW writes new servo sectors (SNs) by a write element 122 located at a track (TN) at the outside-diameter side (OD side) or the inside-diameter side (ID side) while reading written servo sectors (SOs) in a track (TO) at the inside-diameter side or the outside-diameter side by a read element 121 in a magnetic-recording head 120 Namely, while the read element 121 follows, alternatively referred to by the term of art, "locks on," each servo pattern sector in the reference track TO, the write element 122 writes the new servo sector SN at a specific interval after the detection of each sector. By writing servo sectors while moving the magnetic-recording head 120 outward, or inward sequentially, servo data are written over the entire surface of the magnetic-recording disk 11.

With further reference to FIG. 2, in accordance with an embodiment of the present invention, the positional relation between the read element 121 and the write element 122 is shown. As used herein, the read-write offset is defined by the distance in the radial direction between the read element 121 and the write element 122. Specifically, the read-write offset is the distance between the centers of the read element 121 and the write element 122 in the radial direction of the magnetic-recording disk 11. The read-write offset varies depending on the radial position of the magnetic-recording head 120.

The magnetic-recording head 120 may be designed to have the read-write offset at any track position from the ID to the OD. The read-write offset allows the HDD 1 to read inner written patterns so as to position the magnetic-recording head 120 and write servo sectors up to the outermost track. In this way, SSW writes the next patterns at positions displaced by the read-write offset from the written patterns in the radial direction while referring to patterns previously written by SSW and performing the temporal control, which is the timing control in the circumferential direction, and the spatial control, which is the positional control in the radial direction, using the timing and spatial information gained from the signals of the patterns. As described herein, in one embodiment of the present invention, the read element 121 is assumed to be located, by way of example without limitation thereto, closer to the inside diameter (ID) of the magnetic-recording disk than the write element 122 above the magnetic-recording disk 11. Writing servo sectors from the inner side allows for the read element 121 to read servo sectors written in advance by the write element 122. Writing servo sectors from the inner side enables the write element 122 to write new servo sectors while positioning the magnetic-recording head 120 by servo sectors read by the read element 121. However, in other embodiments of the present invention, SSW may start from the outer side by switching the relative positions of the read element 121 and the write element 122.

Figure 3:
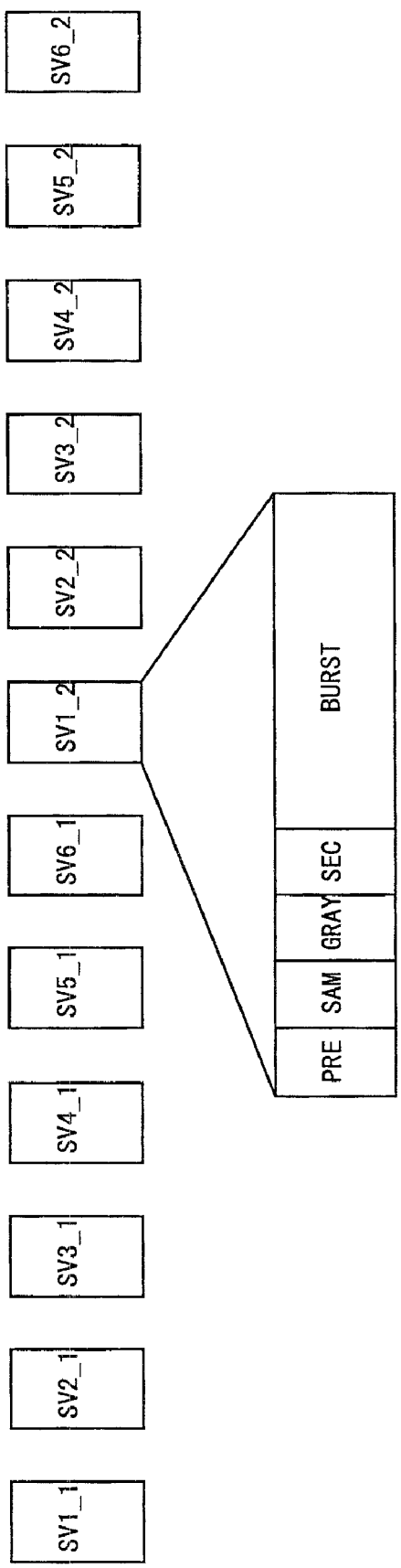
FIG. 3 illustrates a portion of a servo track written with SSW, in accordance with an embodiment of the present invention.

With reference now to FIG. 3, in accordance with an embodiment of the present invention, a portion of a servo track written in SSW is shown. A servo track includes multiple servo sector sets. As shown in the example of FIG. 3, one servo track includes six servo sector sets. The servo sectors are designated by SV1_k to SV6_k, respectively, and k is the number in each servo sector set and SV1 to SV6 represent the servo sector sets, respectively. The number k is a natural number and no more than the number of sectors in a servo sector set. In FIG. 3, two servo sectors (k=1,2) in each servo sector set are illustrated. FIG. 3 is a diagram for illustration purposes that does not accurately reflect the actual size of the servo sector in the radial direction and the actual spacing between servo sectors. The max value of k is the same as the number of servo sectors in a product.

With further reference to FIG. 3, in accordance with an embodiment of the present invention, after SSW, the HDC/MPU 23 selects one servo sector of the servo sector set as the product servo sector set used in access of user data. Thus, in the HDD 1 when used as a product, as is well known, a plurality of servo areas are formed on the magnetic-recording disk 11 so that the plurality of servo areas are located discretely at specific angles and extend in the radial direction. Each servo area has a single servo sector at each radial position. In an embodiment of the present invention, a way to select a servo sector set used in the product is subsequently described. In each servo sector set, servo sectors are written at regular intervals in the circumferential direction. Namely, the spacing between SVn_k and SVn_k+1 is constant. "n" is a natural number indicating one of the servo sector sets. The spacing between sectors of the same set is common to all the servo sector sets. For example, in the example of FIG. 3, the spacing between servo sectors SV0_1 and SV0_2 which are adjacent to each other in a servo sector set is the same as the spacing between adjacent servo sectors SV1_1 and SV1_2 in another servo sector set. The same holds true for the other servo sector sets. In the example of FIG. 3, the spacing between adjacent servo sectors, which belong to other servo sectors, is also constant. However, the spacing between adjacent servo sectors changes depending on the design.

With further reference to FIG. 3, in accordance with an embodiment of the present invention, after SSW, SSW utilizes original functions implemented in the HDD 1. In one embodiment of the present invention, the HDD 1 forms servo sectors with the same pattern configuration as the servo sectors used in access of user data and performs the magnetic-recording head positioning and the timing control by use of the servo sectors. To this end, in one embodiment of the present invention, each servo sector has the same format as the definitive servo sector used in access of user data. Specifically, in the example of FIG. 3, each servo sector includes a preamble (PREAMBLE), a servo address mark (SAM), a track identification of gray code (GRAY), a servo sector number (SEC) and a burst pattern (BURST). The SAM is a section that indicates the start of actual information such as the track identification; and, the SAM signal, which is a signal provided upon detection of the SAM, has the precise correlation to the position written on the magnetic-recording disk 11. The burst pattern (BURST) is a signal indicating the precise position in the servo track designated by the track identification. In this example, the burst pattern has four amplitude signals that are staggered, which are designated A, B, C and D that are written at different tracks displaced in the circumferential direction. In another embodiment of the present invention, in order to identify the servo sector set to which each servo sector belongs, each servo sector contains data indicating the set thereof. To this end, each servo sector contains information indicating the set each servo sector belongs to in one of the fields. For example, each servo sector contains the information indicating the set of the servo sector in the SAM. Typically, servo sectors with the same k have the same servo sector number. Servo sectors in the same servo track have the same track identification.

With further reference to FIG. 3, in accordance with an embodiment of the present invention, several different servo sector fat Hats are known such as a format without the servo sector number and a format having a field storing information of repeatable run out (RRO) in addition to the above-described fields. Embodiments of the present invention may be applied to any HDD using any servo sector format. Each servo sector written in SSW may have a different format from the product servo sector. Specifically, each servo sector may have one or more fields for positional control and/or timing control in addition to the fields of the product servo sector. In accordance with an embodiment of the present invention, as described above, servo sectors are written with the same format as the product servo sector for performing SSW utilizing the original functions of the HDD 1. The HDC/MPU 23 may locate the servo track position by the track identification in a servo sector and locate the precise radial position within the track by use of the burst pattern. The RW channel 21 measures the SAM detection timing accurately and the value is transferred to the HDC/MPU 23. The HDC/MPU 23 determines the timing to write a new servo sector at the outer side by use of the SAM detection timing and the internal clock in the RW channel 21.

Figure 4:
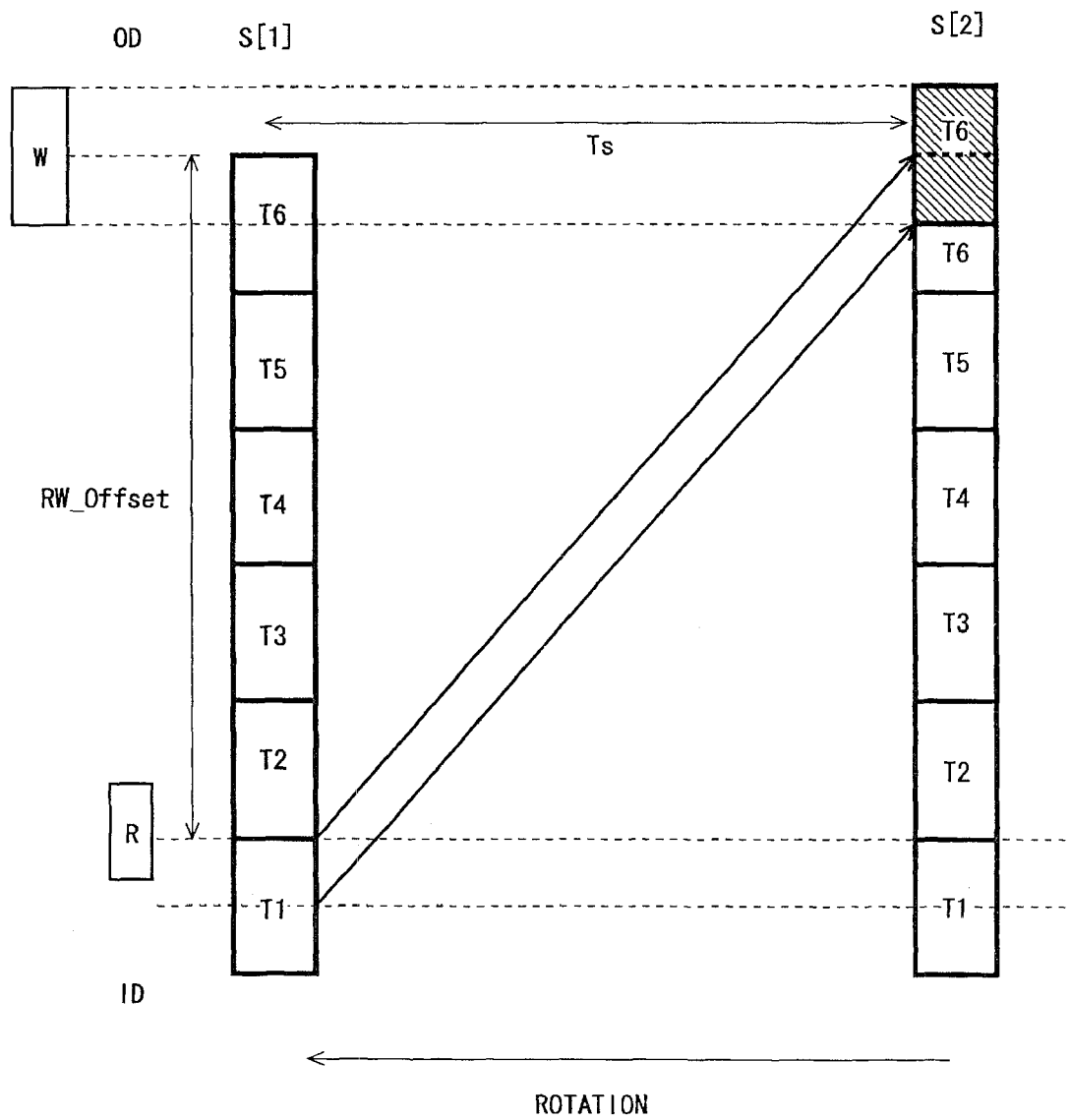
FIG. 4 illustrates an example process to write a new servo track T6 disposed closer to the outside diameter (OD), the "outer side," of the magnetic-recording disk than the read element positioned at inner servo tracks T1, or T2, in accordance with an embodiment of the present invention.

With reference now to FIG. 4, in accordance with an embodiment of the present invention, an operation to write a new outer servo track T6 with the read element 121 positioned at an inner servo track T1, or T2, is shown. The read element 121 and the write element 122 move from the left to the write in the drawing. As shown in FIG. 4, the read element 121 is positioned at a position such that the read element 121 overlaps with both a portion of the servo track T1 and a portion of the servo track T2. The positional control of the read element 121 uses the track identification and the burst pattern and may refer to either servo track. An example referring to the servo track T1 is next described.

With further reference to FIG. 4, in accordance with an embodiment of the present invention, the HDC/MPU 23 writes a servo sector S[2] in the outer servo track T6 based on a servo sector S[1] in the inner servo track T1. The spacing of the read-write offset exists between the read element 121 and the write element 122. As described referring to FIG. 3, using the SAM of the servo sector S[1] read by the read element 121 as the reference, the HDC/MPU 23 writes the new servo sector S[2] by the write element 122 after a specific time Ts has elapsed based on the clock of the RW channel 21. The servo tracks T2 to T5 and a half of the servo track T6 have been already written between the read element 121 and the write element 122.

With further reference to FIG. 4, in accordance with an embodiment of the present invention, the HDC/MPU 23 writes servo data from the inner side to the outer side so that the outer half of inner written servo sectors and the inner half of outer servo sectors overlap each other. Therefore, the track pitch at writing new outer servo sectors (servo track) is the half of the track pitch of the written servo tracks. Thus, the HDD 1 writes the same pattern two consecutive times at different radial positions. Writing servo sectors to overlap in the radial direction, the HDD 1 may form servo sectors, which define a servo area, continuous in the radial direction. In the servo writing in a half servo track pitch, a new servo track is completed by two writing operations; and, either operation is a operation to write a new servo track, which includes servo sectors. SSW may write each servo track in one servo track pitch, instead of a half servo track pitch, depending on design. In an embodiment of the present invention, as described referring to FIG. 3, SSW writes a plurality of sets of servo sectors in a servo track. In one embodiment of the present invention, a way to write a plurality of servo sector sets is next described, referring to FIGS. 5 and 6. The read element 121 is positioned at an inner servo track TN and the write element 122 writes new servo sectors, of a corresponding servo track, at a radial location determined by the read-write offset that disposes the write element 122 closer to the OD than the read element 121, by way of example without limitation thereto.

Figure 5:
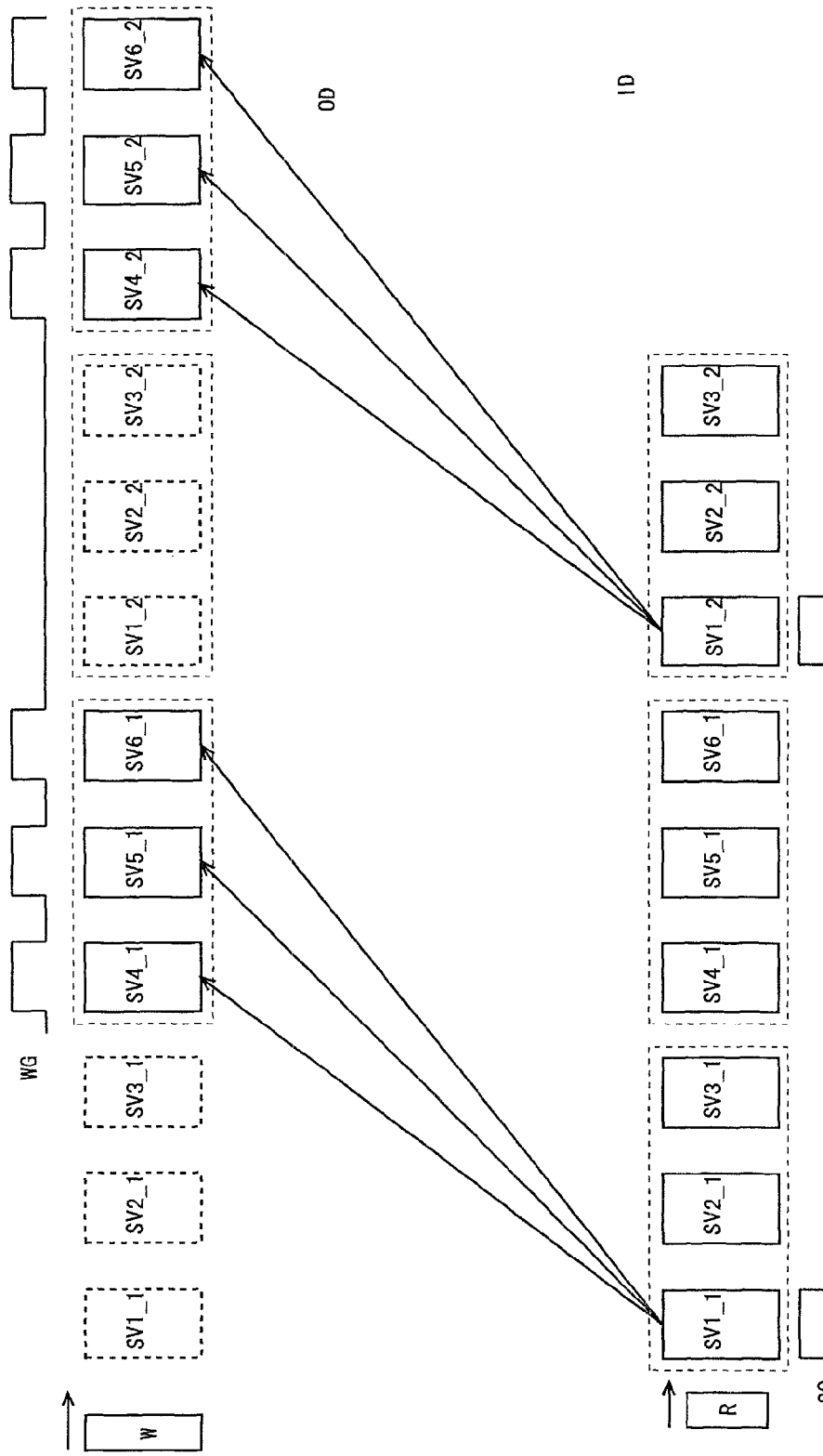
FIG. 5 illustrates an example scheme for writing a plurality of servo sector sets, in accordance with an embodiment of the present invention.
Figure 6:
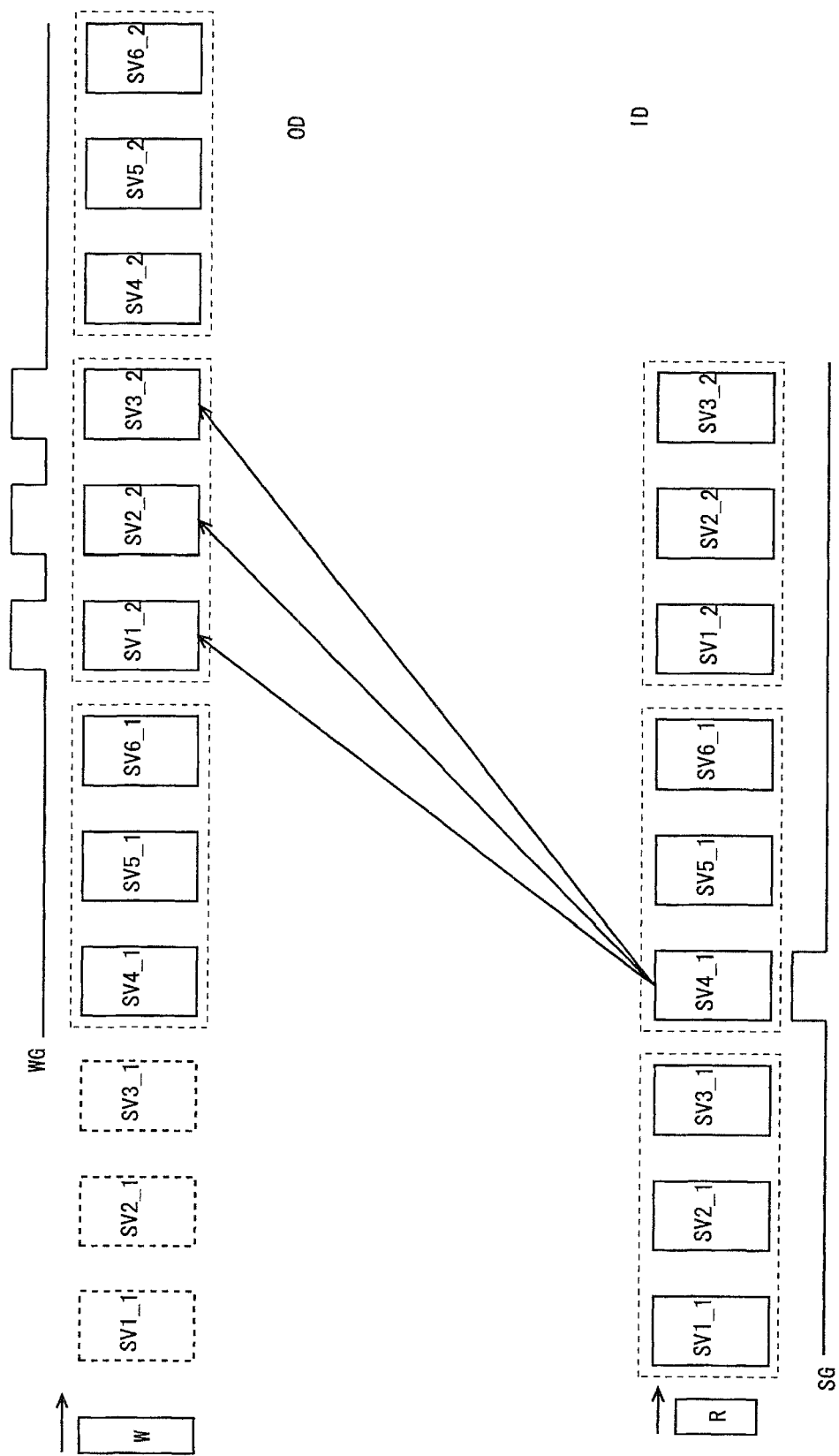
FIG. 6 illustrates another example scheme for writing a plurality of servo sector sets, in accordance with an embodiment of the present invention.

With reference now to FIGS. 5 and 6, in accordance with an embodiment of the present invention, the rotation of the magnetic-recording disk 11 is directed from the right side to the left side in the drawings; and, the read element 121 and the write element 122 move from the left side to the right side in the drawings. In FIGS. 5 and 6, the servo tracks filling in the space between the inner servo track and the outer servo track to be newly written are not shown. In the operation in FIG. 5, the HDC/MPU 23 writes the servo sectors SV4_1 to SV6_1 by the write element 122 based on the read timing of the servo sector SV1_1 by the read element 121. The HDC/MPU 23 also writes the servo sectors SV4_2 to SV6_1 by the write element 122 based on the read timing of the servo sector SV1_2 by the read element 121. In the operation in FIG. 6, the HDC/MPU 23 writes the servo sectors SV1_2 to SV3_2 by the write element 122 based on the read timing of the servo sector SV4_1 by the read element 121.

With further reference to FIG. 5, in accordance with an embodiment of the present invention, in the entire servo track, the HDC/MPU 23 writes the servo sectors SV4_k to SV6_k based on the servo sector SV1_k. Furthermore, the HDC/MPU 23 writes the servo sectors SV1_k+1 to SV3_k+1 based on the servo sector SV4_k. Thus, the servo sector sets SV1, SV2 and SV3 constitute a group, designated a first group, herein, and the servo sector sets SV4, SV5 and SV6 constitute another group, designated a second group, herein. One servo track includes these two groups. In accordance with an embodiment of the present invention, the HDC/MPU 23 uses only the reference servo sectors of the write timing of new servo sectors for the positional control of the read element 121 without using the other sectors. As shown in FIG. 5, the HDC/MPU 23 performs the positional control of the read element 121 using each servo sector $SV1\_k$ and writes the outer new servo sectors $SV4\_k$ to $SV6\_k$ based on the detection timing of the SAM in each servo sector $SV1\_k$. The write operation of the servo sectors of the second group takes one rotation of the magnetic-recording disk 11.

Similarly, with further reference to FIG. 6, in accordance with an embodiment of the present invention, the HDC/MPU 23 performs the positional control of the read element 121 using each servo sector $SV4\_k$ and writes the outer new servo sectors $SV1\_k+1$ to $SV3\_k+1$ based on the detection timing of the SAM in each servo sector $SV4\_k$. The write operation of the servo sectors of the first group takes one rotation of the magnetic-recording disk 11. The HDC/MPU 23 selects the servo sector set SV1 from the multiple servo sector sets according to a predetermined process flow. Furthermore, the HDC/MPU 23 carries out the positional control of the magnetic-recording head 120 to lock on each servo sector $SV1\_k$ in the servo sector set SV1. As described referring to FIG. 2, each servo sector has the identifying information of the servo sector set to which each servo sector belongs, for example, in the SAM. The HDC/MPU 23 may determine the servo sector to be selected by referring to the identifying information. The HDC/MPU 23 sends the timing control signal to the RW channel 21 and the RW channel 21 decodes servo signals read by the head-slider 12 in accordance with the timing signal and transfers them to the HDC/MPU 23. The timing signal is also referred to by the term of art, "servo gate."

With further reference to FIG. 5, in accordance with an embodiment of the present invention, a timing profile SG indicating the servo gate timing is shown. The HDC/MPU 23 opens, enables, the servo gate according to the read timing of each servo sector $SV1\_k$ of the servo sector set SV1, in sync with the servo sector set SV1, and obtains servo data from the RW channel 21. The spacing between the servo sectors is constant; and, the servo gave is enable at predetermined regular intervals. In this way, the HDC/MPU 23 writes the servo sector set SV4 to SV6 constituting a portion of the new servo track with the write element 122 while following each servo sector $SV1\_k$ of the servo sector set SV1. If the HDC/MPU 23 detects the SAM of the servo sector $SV1\_k$, the HDC/MPU 23 opens, enables, the write gate, which is a timing control signal for the data write, during three preset periods based on the detection timing. In FIG. 5, a timing profile WG indicating the write gate timing is shown. The duration from the reference timing to each period and the length of each period are preset. The RW channel 21 sends servo data from the HDC/MPU 23 to the AE module 13 while the write gate is open; and, the write element 122 writes the servo sectors $SV4\_k$ to $SV6\_k$ of the second group. The HDC/MPU 23 repeats the process during one rotation of the magnetic-recording disk 11 to write all the servo sector sets SV4 to SV6 based on the servo sector set SV1.

With further reference to FIG. 6, in accordance with an embodiment of the present invention, the HDC/MPU 23 next writes the servo sector set SV1 to SV3 constituting a portion of the new servo track with the write element 122 while locking on each servo sector $SV4\_k$ of the servo sector set SV4. The write operation is similar to the write operation on the servo sector set SV1. The timing control with the servo gate and the write gate is the same as the above-described process except that the reference servo sectors are different. As for the above example, in an embodiment of the present invention, the multiple servo sector sets constituting one servo track includes two groups: a first group and a second group. The HDC/MPU 23 writes all the servo sector sets of the second group while locking on one servo sector set of the first group. Further, the HDC/MPU 23 writes all the servo sector sets of the first group while locking on one servo sector set of the second group. In this way, the HDD 1 is capable of writing all the servo sectors of one servo track in two rotations of the magnetic-recording disk 11.

With further reference to FIG. 6, in accordance with an embodiment of the present invention, in the writing of a new servo track, the HDC/MPU 23 may write one servo sector set while locking on one servo sector set. The HDC/MPU 23 selects the servo sector sets SV1 to SV6 one-by-one and writes the servo sector sets corresponding to the selected servo sector set in the outer servo track one-by-one. In one embodiment of the present invention, considering a reduction in the processing time and problems regarding defective sectors subsequently described, a plurality of servo sector sets are written while locking on one servo sector set. In another embodiment of the present invention, the HDC/MPU 23 writes all the servo sector sets concurrently in the group, in one rotation of the magnetic-recording disk 11.

With further reference to FIGS. 5 and 6, in accordance with an embodiment of the present invention, the servo sectors of the multiple servo sector sets written together, which are written in one rotation of the magnetic-recording disk 11, are adjacent to each other. The multiple servo sector sets are written together because if the servo sectors to be written based on one servo sector are separately located, the time to finish writing the servo sectors is increased and the possibility is increased that a deviation of the write timing increases. In the embodiment of the present invention described above in the discussion of FIGS. 5 and 6, the three servo sectors written together are consecutive every rotation. In accordance with an embodiment of the present invention, the servo sectors with the same suffix k in one group are arranged consecutively. In one embodiment of the present invention, if the servo sector sets are divided into a plurality of groups, the servo sector sets are divided into two groups, similar to the above-described example. Thus, all the servo sectors are written in two rotations of the magnetic-recording disk 11. However, if the HDC/MPU 23 is enabled to perform more precise write timing control with more divided groups, the servo sectors may be divided into three, or more, groups. A portion of the groups may consist of a single servo sector set. The number of servo sector sets constituting a group may vary among the groups.

With further reference to FIGS. 5 and 6, in accordance with an embodiment of the present invention, as described above, servo sectors are read with the timing control similar to the process in user data access in order to utilize the original functions of the HDD 1. Depending on design, however, the HDD 1 may write a new servo track while performing the positional control and the timing control in synchronization with multiple servo sector sets. In writing of servo data, if a defect may exist in a servo sector due to a defect area on the magnetic-recording disk 11, the servo sector may not read correctly. If there is a defective servo sector, the HDC/MPU 23 reads out a servo sector in a servo sector set different from the one of the defective servo sector and performs the positional controlling and the timing control based on the servo sector in a servo sector set different from the one of the defective servo sector. Use of a servo sector in a different servo sector set enables maintenance of precise positional and timing control even if a servo sector selected as the reference has a defect.

Figure 7:
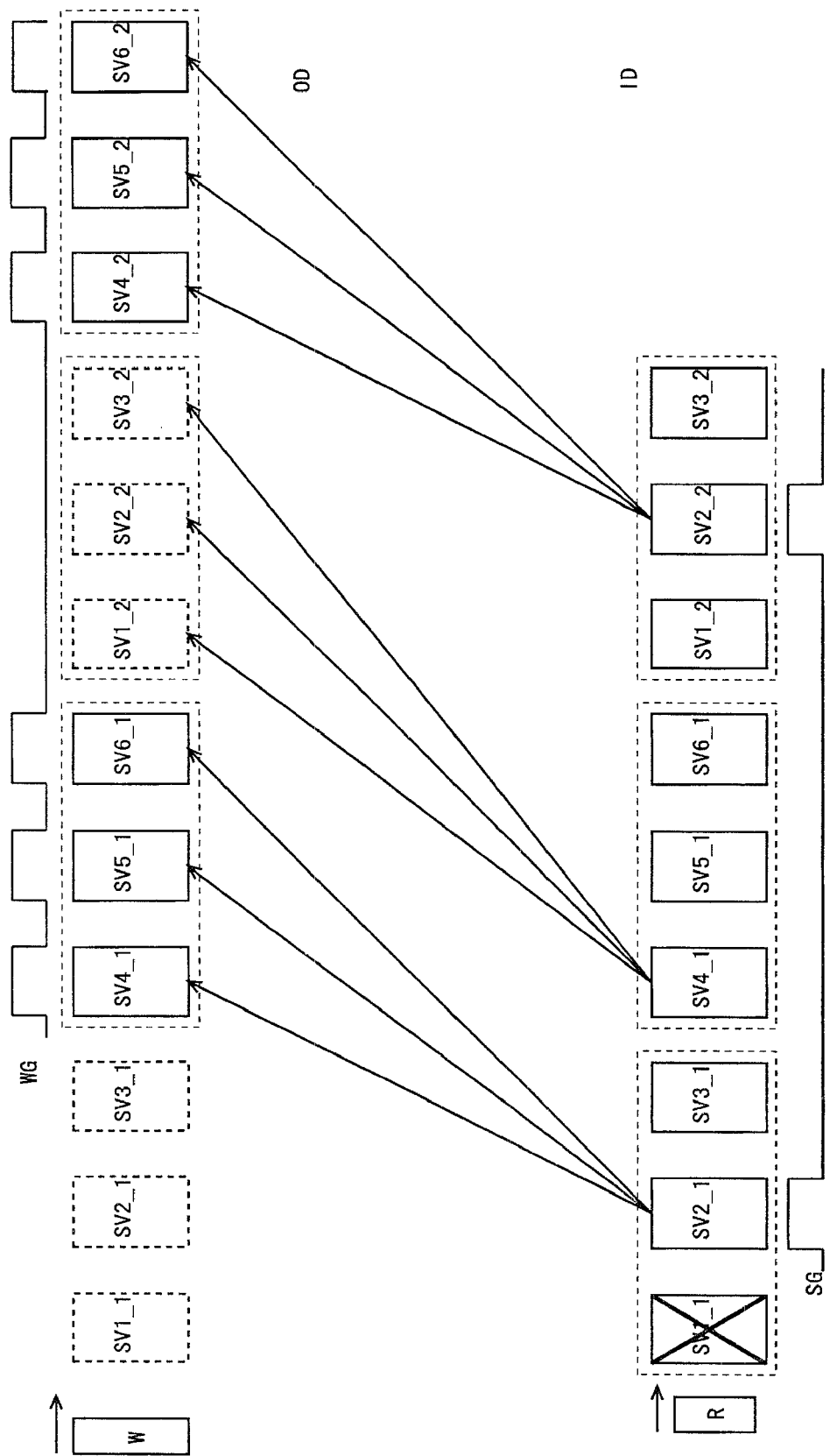
FIG. 7 depicts an example, which is incapable of reading out a servo sector correctly, because the servo sector contains a defect, relevant to an embodiment of the present invention.

With reference now to FIG. 7 and further reference to FIGS. 5 and 6, in accordance with an embodiment of the present invention, a process is next described where a defect is detected in a servo sector in the example described in the discussion of FIGS. 5 and 6. FIG. 7 depicts an example which is incapable of reading out a servo sector SV1_1 correctly because servo sector SV1_1 has a defect. In the example of FIG. 7, the servo sector set SV2 has no defective sectors and the HDC/MPU 23 writes outer servo sector sets SV4 to SV6 while locking on and following the servo sector set SV2. The writing of the servo sector sets SV4 to SV6 based on the servo sector set SV2 is substantially similar to the writing based on the servo sector set SV1 but the time that elapses before the first servo sector SV4_k is written is different. FIG. 7 shows the timing control signal corresponding to the write of the servo sector sets SV4 to SV6. In the example of FIG. 7, the servo sector set SV4 has no defective sectors. Therefore, the HDC/MPU 23 carries out the positional control of the read element 121 using the first selected servo sector set SV4 and writes the servo sector sets SV1 to SV3 while performing the timing control based on the set. The timing control signal is omitted in FIG. 7.

With further reference to FIG. 7, in accordance with an embodiment of the present invention, as described above, if the HDC/MPU 23 has found a defective servo sector, the HDC/MPU 23 selects another servo sector set from the same group. In the above example, if the servo sector sets SV2 also has a defective sector, the HDC/MPU 23 selects another servo sector set SV3 in the first group. In another embodiment of the present invention, if any servo sector set has a defective sector, the servo sector set is selected that has the fewest defective sectors. If the HDC/MPU 23 uses another servo sector set instead of the servo sector set SV1 of the first alternative, the number of defects in the sector set is to be no more than the number of defects in the sector set SV1. The HDC/MPU 23 performs the process for the second group in accordance with the similar process flow. If the selected servo sector set has a defective servo sector, the HDC/MPU 23 selects another servo sector set in the second group and checks whether the servo sector set has a defective sector, or not. If there is no defective sector in the selected servo sector set, the HDC/MPU 23 writes new servo sectors with reference to the servo sector set in the timing control and the positional control.

Figure 8:
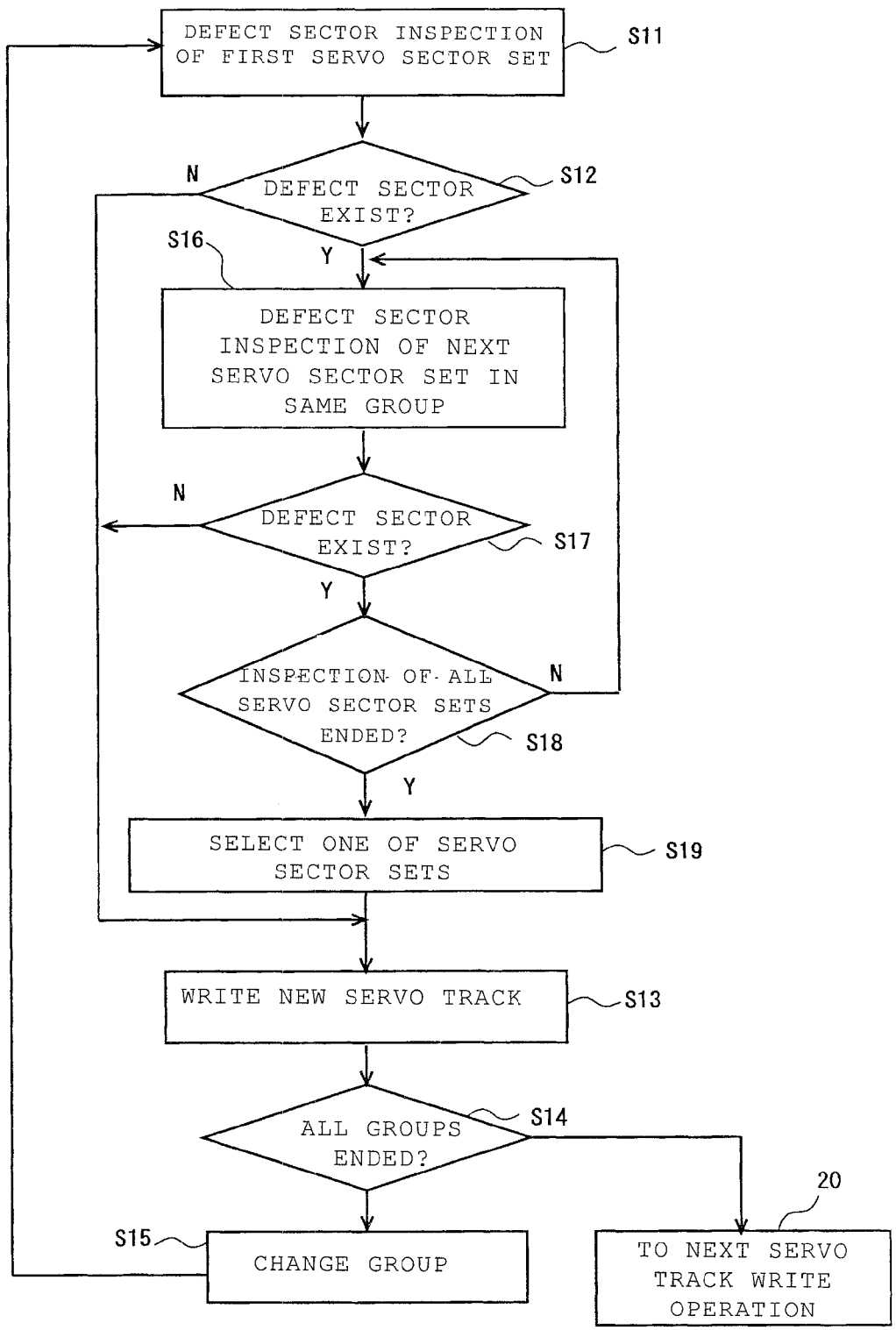
FIG. 8 is an example flowchart showing a write process of a new servo track including defect inspection and a process for existing defective servo sectors, in accordance with an embodiment of the present invention.

With reference now to FIG. 8, in accordance with an embodiment of the present invention, a flowchart is shown of an example write process of a new servo track including defect inspection and a process for existing defective servo sectors, which are next described. First, the HDC/MPU 23 moves the read element 121 to an inner reference track. The HDC/MPU 23 searches for the first servo sector set in accordance with firmware. At S11, the HDC/MPU 23 carries out the defective servo sector inspection in the first servo sector set. Specifically, the HDC/MPU 23 attempts to read each servo sector in the first servo sector set and determines whether all the sectors are read correctly, or not. If there is no defective sector (N-branch after S12), at S13, the HDC/MPU 23 locks on the first servo sector set and writes a new servo sector set. Since the writing of the servo sector sets of all the groups has not ended yet (N-branch after S14), at S15, the HDC/MPU 23 starts the write process of a servo sector set in another group. If there is one, or more, defective sectors in the first servo sector set (Y-branch after S12), at S16, the HDC/MPU 23 selects another servo sector set different from the previous servo sector set from the same group, and, at S17,
carries out the defective servo sector inspection in the set to determine whether there is a defect, or not. If the HDC/MPU 23 is capable of reading out all the servo sectors correctly and there is no defective sector (N-branch after S17), at S13, the HDC/MPU 23 locks on the servo sector set and writes a new servo sector set. If the writing of the servo sector sets of all the groups has ended (Y-branch after S14), HDC/MPU 23 proceeds with the next servo track write process, and if not, the HDC/MPU 23 repeats the operation S15 and the following operations.

With further reference to FIG. 8, in accordance with an embodiment of the present invention, if there is one, or more, defective sectors (Y-branch after S17) and the inspection of all the servo sector sets has ended (Y-branch after S18), at S13, the HDC/MPU 23 selects a servo sector set and writes a new servo sector set while locking on the servo sector set. If the inspection of all the servo sector sets has not ended (N-branch after S18), at S16, the HDC/MPU 23 carries out the defective servo sector inspection in another uninspected servo sector set in the same group. In a typical process of one embodiment of the present invention, at least one servo sector set in a group includes only non-defective servo sectors (N-branch after S12, or alternatively, N-branch after S17). However, all the servo sector sets may have defective servo sectors. In such a case, the HDC/MPU 23 selects the servo sector set with the fewest defective servo sectors in the operation S19 and writes a new servo track under the control with the set. The HDC/MPU 23 skips a defective servo sector and writes the servo sector corresponding to the defective servo sector with reference to the next previous servo sector. Thus, even if all the servo sector sets have defective servo sectors, the HDC/MPU 23 is enabled to perform the more precise positional and timing control under these circumstances.

With further reference to FIG. 8, in accordance with an embodiment of the present invention, the HDC/MPU 23 reads out the selected servo sector set to check for the presence of a defective servo sector before starting to write the new servo data. In accordance with an embodiment of the present invention, this process provides reliable servo control. However, if an alternative design of SSW is possible, the HDC/MPU 23 may perform the servo writing using the multiple servo sector sets in another procedure. For example, the HDC/MPU 23 locks on the first servo sector sets (SV1 in FIG. 7, for example) without the read process for the detection of defective servo sectors at S11, or at S16, and writes the outer servo sector sets. If a servo sector is not read correctly, which means that there exists a defective servo sector, the HDC/MPU 23 skips the servo sector and also skips writing of the corresponding servo sector. Then, the HDC/MPU 23 writes the skipped servo sector while locking on another servo sector set (SV2 in FIG. 7, for example). Otherwise, if the HDD 1 may select different servo sector sets for sectors respectively, the HDC/MPU 23 may write a new servo sector using a non-defective servo sector in a servo sector set (SV1 in FIG. 7, for example). In the writing of the servo sector corresponding to a detected defective servo sector, the HDC/MPU 23 may use a servo sector in another servo sector set (SV2 in FIG. 7, for example). In the process in accordance with the flowchart of FIG. 8, if the selected servo sector set has a defective servo sector, the HDC/MPU 23 checks for the presence of a defective servo sector in another servo sector set. Otherwise, the HDC/MPU 23 may read all the servo sector sets in the group for the inspection to identify defective servo sectors in the servo track before writing the new servo sectors.

Figure 9:
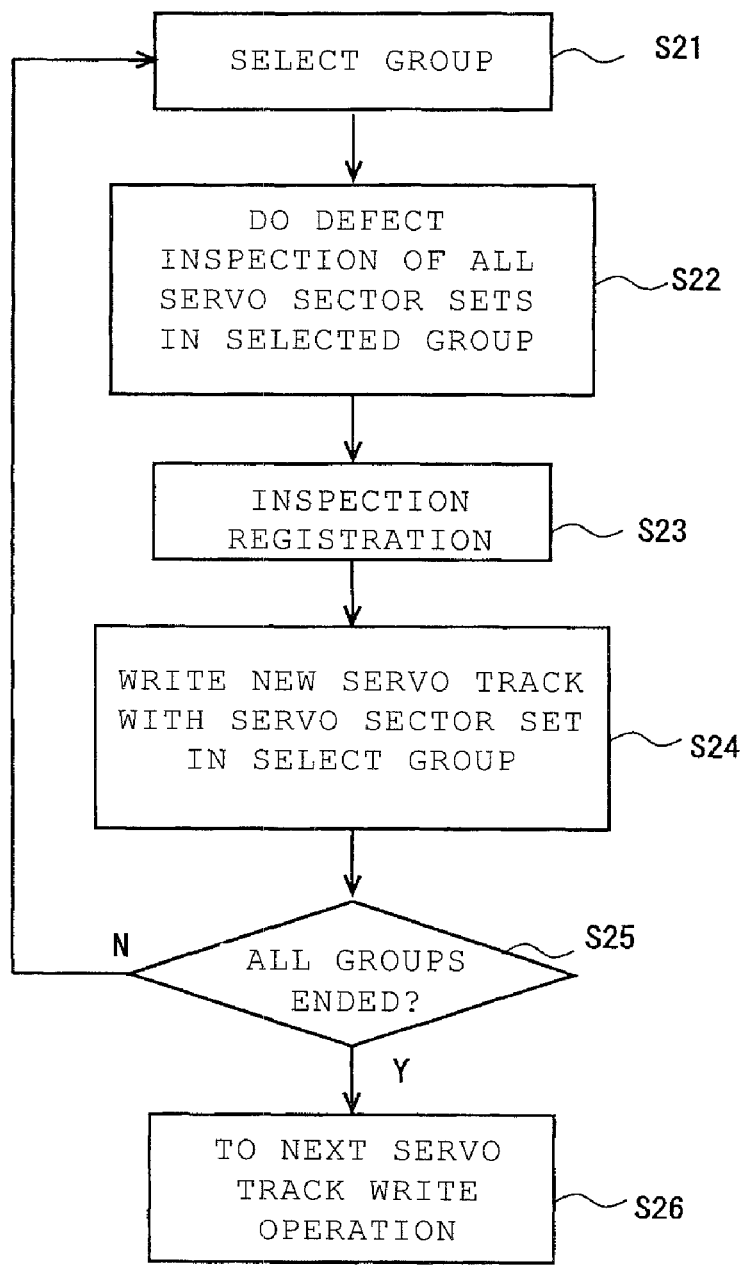
FIG. 9 is an example flowchart of a process for reading all the servo sector sets in a group for inspection to identify defective servo sectors in the servo track before writing new servo sectors, in accordance with an embodiment of the present invention.

With reference now to FIG. 9, in accordance with an embodiment of the present invention, a flowchart is shown. At S21, the HDC/MPU 23 selects a group, which may be, for example, the first group in FIG. 5, and, at S22, attempts to read each sector in the servo sector sets of the group (SV1 to SV3 in FIG. 5, for example), and identifies defective servo sectors. If a defective servo sector exists, at S23, the HDC/MPU 23 records defective servo sectors in a table in the RAM 24. The HDC/MPU 23 selects a servo sector set with no defective sectors, or alternatively, the fewest defective sectors. At S24, the HDC/MPU 23 writes the new servo sectors (SV4 to SV6 in FIG. 5, for example) while locking on the selected servo sector set. If writing of servo sectors of all the groups has ended (Y-branch after S25), at S26, the HDC/MPU 23 proceeds with the next servo track write process. If not ended (N-branch after S25), at S21, the HDC/MPU 23 selects another group (the second group in FIG. 5, for example) and repeats the above described process.

With further reference to FIG. 9, in accordance with an embodiment of the present invention, thus, in one embodiment of the present invention, the inspection of all the servo sector sets is performed to determine the servo sector set used for user data access in the end product. In addition, in another embodiment of the present invention, the inspection of all the servo sector sets is performed to incorporate defective sectors in SSW into the defect registration for user data recording. Depending on the elected design, the HDC/MPU 23 may inspect uninspected servo sector sets after wring the outer servo sectors. The HDC/MPU 23 selects the servo sector set used in user data access after writing the servo data over the entire recording surface. Typically, the HDC/MPU 23 selects one servo sector set. In one embodiment of the present invention, a servo sector set is selected that has less defective servo sectors for precise servo control. Thus, in an embodiment of the present invention, the HDC/MPU 23 selects a servo sector set having defective sectors fewer than the reference and selects the servo sector set having the fewest defective servo sectors.

In accordance with the embodiment of the present invention described above in the discussion of the flowchart of FIG. 9, the HDC/MPU 23 registers defective sectors in the tracks used for the servo control in SSW while writing new servo tracks. Thus, the HDC/MPU 23 is capable of efficiently selecting an appropriate servo sector set without another inspection after the servo data write. In accordance with an embodiment of the present invention, the HDC/MPU 23 incorporates defective servo sectors detected in SSW into defect registration in the user data recording area. Typically, the HDC/MPU 23 selects a servo sector set as the product servo sector set from the multiple servo sector sets. Thus, a user data area includes the area between servo sectors of the selected servo sector sets and user data are recorded in the areas where the servo sectors of the other servo sector sets are recorded. The HDC/MPU 23 calculates the addresses of data sectors from the addresses of defective servo sectors detected in SSW and registers the addresses as a defective data sector in a table. The HDD 1 generally carries out defect inspection over the entire recording surface of the magnetic-recording disk after SSW. The defect registration by SSW facilitates inspection of the entire surface, or makes surface inspection more reliable.

As set forth above, embodiments of the present invention have been described by way of example without limitation thereto and may of course be modified in various ways within the spirit and scope of embodiments of the present invention. For example, the embodiments of the present invention may be applied to a disk drive using other kinds of rotatable disks in addition to the magnetic-recording disks of HDDs. A controller dedicated to SSW may perform SSW in an embodiment of the present invention, instead of utilizing a circuit mounted on the product HDD.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for writing servo sector sets, each set comprising a plurality of separate servo sectors in a circumferential direction at different radial positions on a disk so that servo sectors are present at same circumferential positions but with different radial positions, said method comprising:
reading a first servo sector set in a track with a read element, said track comprising said first servo sector set, a second servo sector set and a third servo sector set;
writing said third servo sector set with a write element at a different radial position from said read element with positional control and timing control using said first servo sector set while skipping said second servo sector set if all servo sectors of said first servo sector set are non-defective; and
using positional control and timing control using said second servo sector set in said writing of said third servo sector set if said first servo sector set comprises a defective servo sector.

2. The method according to claim 1, wherein said third servo sector set is written with positional control and timing control with only one servo sector set.

3. The method according to claim 2, further comprising:
inspecting said first servo sector set before writing said third servo sector set; and wherein
if all servo sectors of said first servo sector set are non-defective, said third servo sector set is written by said write element at a different radial position from said read element with said positional control and said timing control using only said first servo sector set, and
if said first servo sector set comprises a defective servo sector and a number of defective servo sectors of said second servo sector set is no more than a number of defective servo sectors of said first servo sector set, said third servo sector set is written with said positional control and said timing control using only said second servo sector set.

4. The method according to claim 1, wherein
one servo track comprises a first group and a second group, each group comprising a plurality of servo sector sets,
said first group comprising said first servo sector set and said second servo sector set,
said second group comprising said third servo sector set,
a plurality of servo sector sets of said second group are written with positional control and timing control using only one servo sector set of said first group, and
a plurality of servo sector sets of said first group are written with positional control and timing control using only one servo sector set of said second group.

5. The method according to claim 4, wherein all servo sector sets of said second group are written with said positional control and said timing control using only one servo sector set of said first group, and all servo sector sets of said first group are written with said positional control and said timing control using only one servo sector set of said second group.

6. The method according to claim 4, further comprising selecting a servo sector set to be used in new writing of a servo sector set after inspecting all servo sector sets in a group.

7. The method according to claim 4, further comprising inspecting all servo sector sets over an entire recording surface of said disk.

8. The method according to claim 7, further comprising selecting said servo sector set with fewest defective servo sectors as a servo sector set used in user data access after writing servo sector sets over said entire recording surface of said disk.

9. The method according to claim 7, further comprising registering a defect detected in an inspection of servo sector sets as a defect in a user data area.

10. A disk drive for writing servo sector sets, each set comprising a plurality of separate servo sectors in a circumferential direction at different radial positions on a disk so that servo sectors are present at same circumferential positions but with different radial positions, said disk drive comprising:
  a read element configured to read a first servo sector set in a track, said track comprising said first servo sector set, a second servo sector set and a third servo sector set;
  a controller configured to perform positional control and timing control using said first servo sector set while skipping said second servo sector set if all servo sectors of said first servo sector set are non-defective, and configured to perform positional control and timing control using said second servo sector set if said first servo sector set comprises a defective servo sector; and
  a write element at a different radial position from said read element configured to write said third servo sector set under said positional control and said timing control of said controller.

11. The disk drive according to claim 10, wherein said write element is configured to write said third servo sector set with positional control and timing control with only one servo sector set.

12. The disk drive according to claim 11, wherein
said controller is configured to inspect said first servo sector set before writing said third servo sector set,
said write element, if all servo sectors of said first servo sector set are non-defective, is configured to write said third servo sector set with said positional control and said timing control using only said first servo sector set, and said write element, if said first servo sector set comprises a defective servo sector and a number of defective servo sectors of said second servo sector set is no more than a number of defective servo sectors of said first servo sector set, is configured to write said third servo sector set with said positional control and said timing control using only said second servo sector set.

13. The disk drive according to claim 10, wherein
one servo track comprises a first group and a second group each comprising a plurality of servo sector sets,
said first group comprising said first and said second servo sector sets,
said second group comprising said third servo sector set,
said write element is configured to write a plurality of servo sector sets of said second group with positional control and timing control using only one servo sector set of said first group, and
said write element is configured to write a plurality of servo sector sets of said first group with positional control and timing control using only one servo sector set of said second group.

14. The disk drive according to claim 13, wherein
said write element is configured to write all servo sector sets of said second group with said positional control and said timing control using only one servo sector set of said first group, and
said write element is configured to write all servo sector sets of said first group with said positional control and said timing control using only one servo sector set of said second group.

15. The disk drive according to claim 13, wherein said controller is configured to select a servo sector set to be used in new writing of a servo sector set after inspecting all servo sector sets in a group.

16. The disk drive according to claim 10, wherein said controller is configured to inspect all servo sector sets over an entire recording surface of said disk.

17. The disk drive according to claim 16, wherein said controller is configured to select said servo sector set with fewest defective servo sectors as a servo sector set used in user data access after writing servo sector sets over said entire recording surface of said disk.

18. The disk drive according to claim 16, wherein said controller is configured to register a defect detected in an inspection of servo sector sets as a defect in a user data area.

* * * * *